(12) United States Patent
Nakajima et al.

(10) Patent No.: US 9,128,397 B2
(45) Date of Patent: Sep. 8, 2015

(54) RESIN FOR USE IN TONER, TONER USING THE RESIN, DEVELOPER USING THE TONER, IMAGE FORMING APPARATUS AND METHOD USING THE TONER, AND METHOD OF MANUFACTURING RESIN

(75) Inventors: Yukiko Nakajima, Shizuoka (JP); Masahide Yamada, Shizuoka (JP); Taichi Nemoto, Shizuoka (JP); Yoshihiro Moriya, Shizuoka (JP); Yoshitaka Yamauchi, Shizuoka (JP); Keiji Makabe, Shizuoka (JP); Daiki Yamashita, Kanagawa (JP); Akiyoshi Sabu, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 41 days.

(21) Appl. No.: 13/471,809

(22) Filed: May 15, 2012

(65) Prior Publication Data

US 2012/0295188 A1 Nov. 22, 2012

(30) Foreign Application Priority Data

May 16, 2011 (JP) ................................. 2011-109675

(51) Int. Cl.
| | |
|---|---|
| *G03G 9/087* | (2006.01) |
| *C08G 63/60* | (2006.01) |
| *C08G 63/66* | (2006.01) |
| *C08G 77/14* | (2006.01) |

(52) U.S. Cl.
CPC ............ *G03G 9/08755* (2013.01); *C08G 63/60* (2013.01); *C08G 63/66* (2013.01); *C08G 77/14* (2013.01); *G03G 9/08795* (2013.01); *G03G 9/08797* (2013.01)

(58) Field of Classification Search
CPC ....... G08G 77/14; G08G 63/60; G08G 63/66; G03G 9/08755

USPC .............. 430/109.4, 109.5; 525/450; 528/354
See application file for complete search history.

(56) References Cited

U.S. PATENT DOCUMENTS

| | | | |
|---|---|---|---|
| 2009/0003885 A1* | 1/2009 | Sabu et al. | ..................... 399/252 |
| 2010/0183967 A1 | 7/2010 | Sabu et al. | |
| 2010/0216068 A1 | 8/2010 | Kotsugai et al. | |
| 2010/0330489 A1 | 12/2010 | Inoue et al. | |
| 2011/0065036 A1 | 3/2011 | Inoue et al. | |
| 2011/0104608 A1 | 5/2011 | Nakajima et al. | |
| 2011/0281213 A1 | 11/2011 | Sakashita et al. | |
| 2012/0288791 A1* | 11/2012 | Sakashita et al. | .......... 430/108.4 |

FOREIGN PATENT DOCUMENTS

| | | |
|---|---|---|
| JP | 7-253687 | 10/1995 |
| JP | 8-302003 | 11/1996 |
| JP | 2006-154623 | 6/2006 |
| JP | 2007-112849 | 5/2007 |
| JP | 2007-333938 | 12/2007 |
| JP | 2008-262179 | 10/2008 |
| JP | 2010-14757 | 1/2010 |
| JP | 2011257681 A * | 12/2011 |

OTHER PUBLICATIONS

English language machine translation of JP 2011-257681 (Dec. 2011).*

Office Action issued Jan. 20, 2015, in Japanese patent application No. 2011-109675 (English translation only, Japanese document previously submitted).

* cited by examiner

*Primary Examiner* — Christopher Rodee
(74) *Attorney, Agent, or Firm* — Oblon, McClelland, Maier & Neustadt, L.L.P.

(57) ABSTRACT

A resin for use in toner is provided. The resin comprises an oligomer segment and a soft segment. The oligomer segment comprises a polyhydroxycarboxylic skeleton and an aromatic diol skeleton.

1 Claim, 3 Drawing Sheets

RESIN FOR USE IN TONER, TONER USING THE RESIN, DEVELOPER USING THE TONER, IMAGE FORMING APPARATUS AND METHOD USING THE TONER, AND METHOD OF MANUFACTURING RESIN

CROSS-REFERENCE TO RELATED APPLICATIONS

This patent application is based on and claims priority pursuant to 35 U.S.C. §119 to Japanese Patent Application No. 2011-109675, filed on May 16, 2011, in the Japanese Patent Office, the entire disclosure of which is hereby incorporated herein by reference.

BACKGROUND

1. Technical Field

The present disclosure relates to a resin for use in toner, a toner using the resin, a developer using the toner, image forming apparatus and method using the toner, and a method of manufacturing resin.

2. Description of Related Art

In an electrophotographic image forming apparatus or electrostatic recording device, an electric or magnetic latent image is developed into a toner image. In electrophotography, for example, an electrostatic latent image is formed on a photoreceptor and is developed into a toner image. The toner image is transferred onto a recording medium, such as paper, and fixed thereon by application of heat, etc.

Toner generally comprises resin particles in which colorant, charge controlling agent, etc., are dispersed, and is manufactured by various processes, such as pulverization, suspension polymerization, dissolution suspension, emulsion aggregation, phase-transfer emulsification, and elongation polymerization.

The resin particles may comprise, for example, a thermoplastic resin such as styrene-acrylic resin, polyester resin, and polyol resin. Polyester resin has superior strength and stability as well as a lower softening point while having a greater molecular weight and a higher glass transition temperature compared to styrene-acrylic resin. Therefore, polyester resin is widely used for toner especially requiring low-temperature fixability. In particular, polyester resin is widely used for toner for full-color printing.

Binder resin generally occupies 70% or more of toner composition. Most binder resins are derived from petroleum resources now being exposed to depletion. Petroleum resources cause a problem of global warming because they discharge carbon dioxide into the air when consumed. On the other hand, binder resins derived from plant resources have been proposed and used for toners. Because plant resources have incorporated carbon dioxide from the air in the process of growing, carbon dioxide discharged from plant resources is merely circulated between the air and plant resources. Thus, plant resources have the potential to solve the problems of both depletion and global warming. For example, polylactic acid, which is readily available, has been used for toner binder.

Polylactic acids consisting of L-form or D-form have high crystallinity. Such polylactic acids are poorly soluble in organic solvents, and therefore they cannot be used for toners manufactured through a process in which binder resin is dissolved in organic solvents. Therefore, polylactic acids are applied to pulverization process, but the pulverization processes undesirably waste a large amount of toner particles in the classification process.

Japanese Patent Application Publication No. 2008-262179 proposes to mix L-form and D-form polylactic acids to reduce crystallinity. It is disclosed therein that solubility in organic solvents is improved thereby.

Japanese Patent Application Publication No. 08-302003 describes a copolymerized polylactic acid obtained by reacting lactic acid with a reaction product of an aromatic dicarboxylic acid with an aliphatic diol, having a low glass transition temperature of 60° C. or less. Japanese Patent Application Publication No. 2007-112849 describes a copolymerized polylactic acid having a fluorenone skeleton, having a glass transition temperature of 60° C. or more.

In attempting to improve low-temperature fixability, Japanese Patent Nos. 4307367 and 3778955 each propose to introduce a soft segment into binder resin.

SUMMARY

In accordance with some embodiments, a resin for use in toner is provided. The resin comprises an oligomer segment and a soft segment. The oligomer segment comprises a polyhydroxycarboxylic skeleton and an aromatic diol skeleton.

In accordance with some embodiments, a toner is provided. The toner includes the above resin.

In accordance with some embodiments, a developer is provided. The developer includes the above toner.

In accordance with some embodiments, image forming apparatus and method are provided. The image forming apparatus and method use the above toner.

In accordance with some embodiments, a method of manufacturing resin is provided. The method includes the step of reacting a hydroxycarboxylic acid or a cyclic ester thereof with an aromatic diol to obtain an oligomer having a polyhydroxycarboxylic acid skeleton and an aromatic diol skeleton. The method further includes the step of reacting the oligomer with a soft material using an elongating agent.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
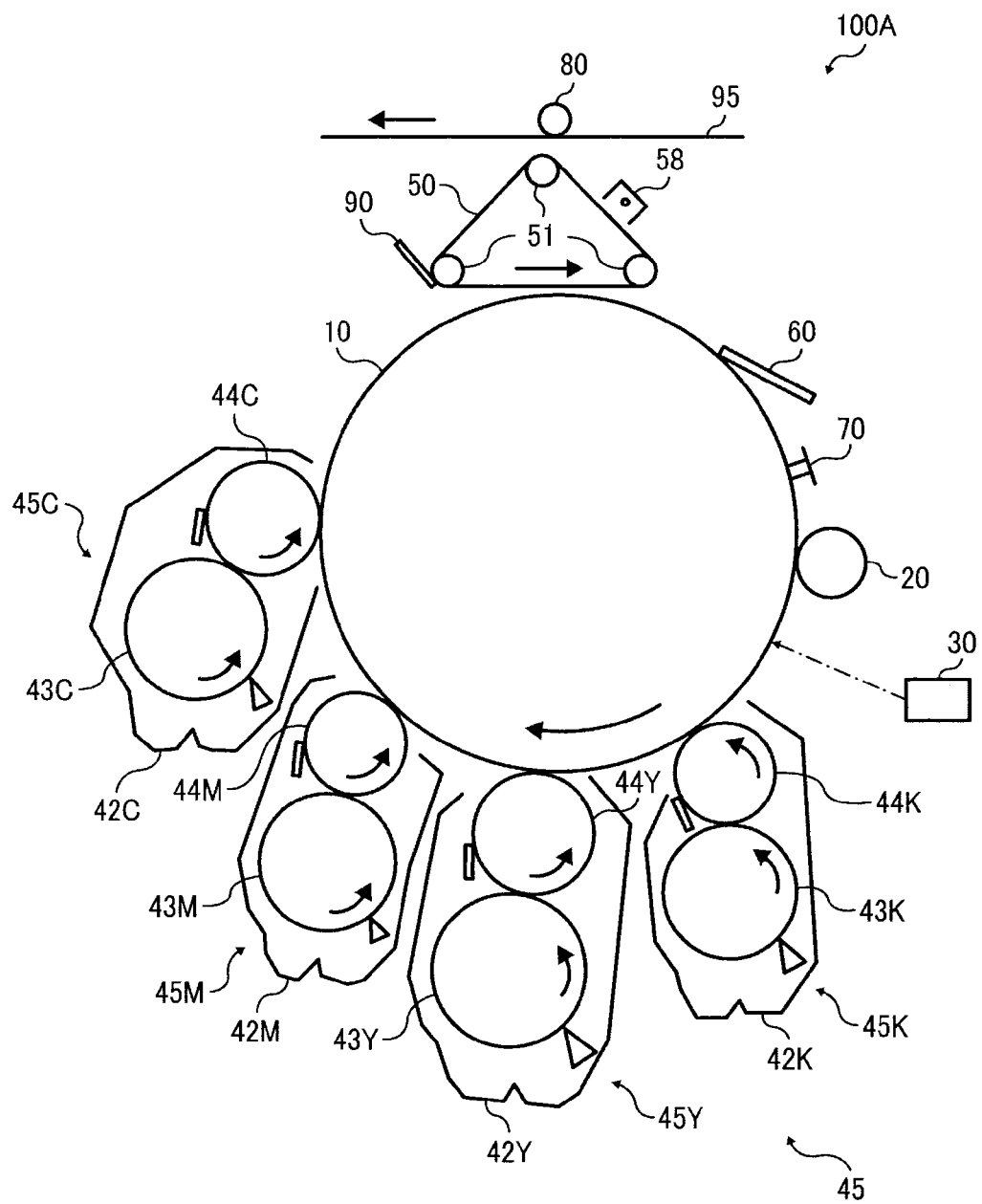
FIG. 1 is a schematic view of an image forming apparatus according to an embodiment.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

A resin according to an embodiment comprises an oligomer segment and a soft segment. The oligomer segment comprises a polyhydroxycarboxylic skeleton and an aromatic diol skeleton. In this specification, an "aromatic diol" is defined as a diol having an aromatic group.

For example, the resin may be obtained by polymerizing a hydroxycarboxylic acid with an aromatic diol to obtain an oligomer, and reacting the oligomer with a soft material using an elongating agent. The resulting resin is a straight-chain polyester resin in which the oligomer segment derived from the oligomer and the soft segment derived from the soft material are randomly copolymerized. The polyhydroxycarboxylic acid skeleton has a polymerization degree smaller than a degree to which polymeric property is expressed (i.e., the number of repeating units is 50 to 100). Additionally, the resin has a high glass transition temperature due to inclusion of the aromatic diol segment expressing a high glass transition temperature while the inherent glass transition temperature of the polyhydroxycarboxylic acid skeleton is diminished. Since the resin randomly comprises the soft segments, the resin is partially flexible, which prevents deterioration of low-temperature fixability.

In this specification, the soft material is defined as a relatively softer material than the aromatic diol expressing a high glass transition temperature.

The polyhydroxycarboxylic acid skeleton has a configuration in which a single hydroxycarboxylic acid is polymerized or multiple hydroxycarboxylic acids are copolymerized. The polyhydroxycarboxylic acid skeleton can be obtained by hydrolysis condensation of hydroxycarboxylic acid or ring-opening polymerization of cyclic ester of the hydroxycarboxylic acid, for example. In some embodiments, the polyhydroxycarboxylic acid skeleton is obtained by ring-opening polymerization of cyclic ester of hydroxycarboxylic acid. In such embodiments, the polyhydroxycarboxylic acid skeleton has a greater molecular weight. When a polyol having 2 or more valences is used as an initiator in the polymerization, the resulting resin has an improved affinity for colorants. In one or more embodiments, the polyhydroxycarboxylic acid skeleton is obtained from an aliphatic hydroxycarboxylic acid in view of transparency and thermal property. In some embodiments, the polyhydroxycarboxylic acid skeleton is obtained from an hydroxycarboxylic acid having 2 to 6 carbon atoms, such as lactic acid, glycolic acid, 3-hydroxybutyric acid, or 4-hydroxybutyric acid. In some embodiments, lactic acid is used in view of glass transition temperature, transparency, and affinity for colorants.

When cyclic ester of hydroxycarboxylic acid is used, the resulting polyhydroxycarboxylic acid skeleton has a configuration in which the hydroxycarboxylic acid is polymerized. For example, the polyhydroxycarboxylic acid skeleton obtained from lactic acid lactide has a configuration in which lactic acid is polymerized. When a mixture of L-monomer and D-monomer is used, a racemic resin can be obtained. For example, a mixture of L-lactide and D-lactide can be used as a raw material. Additionally, the polyhydroxycarboxylic acid skeleton can be obtained by ring-opening polymerization of mesolactide. Mesolactide can be used in combination with L-lactide or D-lactide.

The oligomer having a polyhydroxycarboxylic acid skeleton can be obtained by a typical method of preparing polyester. The number average molecular weight (Mn) of the oligomer can be varied by varying the used amount of a reaction initiator.

The reaction initiator may be, for example, an alcohol which does not volatilize even when dried at about 100° C. under a reduced pressure of 200 mmHg or less or even when heated at a high temperature of about 200° C. in the polymerization. When the monomer is a diol, the resulting oligomer is straight-chain and has hydroxyl groups on both terminals.

In accordance with some embodiments, an aromatic diol (i.e., a diol having an aromatic ring) is used as the reaction initiator. Thus, the resulting oligomer has the aromatic diol skeleton in combination with the polyhydroxycarboxylic acid skeleton. Specific examples of the aromatic diol include, but are not limited to, bis(2-hydroxyethyl)terephthalate (BHET), bis(2-hydroxypropyl)terephthalate (BHPT), alkylene oxide (such as ethylene oxide, propylene oxide, butylene oxide) adducts of bisphenols (e.g., bisphenol A, bisphenol F, bisphenol S), a condensation product of terephthalic acid with 1,10-decanediol, and a condensation product of 2,6-naphthalenedicarboxylic acid with ethylene glycol.

In one or more embodiments, the following compound (I) is used in view of thermal properties. In some embodiments, BHET or BHPT is used.

(1)

The aromatic diol is adapted to increase the glass transition temperature, heat-resistant storage stability, and humidity resistance of the resin. In some embodiments, the content of the aromatic diol skeleton in the resin is 4 to 9% by weight. When the content is less than 4% by weight, the glass transition temperature of the resin is too lower than a straight-chain resin consisting of polyhydroxycarboxylic acid to provide heat-resistant storage stability. When the content is greater than 9% by weight, the glass transition temperature of the resin is too high to provide low-temperature fixability despite the presence of the soft segment. Generally, the content of the aromatic diol skeleton in the resin is proportional to the content of the aromatic diol among all the raw materials. The content of the aromatic diol skeleton in the resin can also be determined from the proton peak area ratio of the polyhydroxycarboxylic acid to the aromatic ring, which can be measured by subjecting the resin to a 1H-NMR measurement.

In some embodiments, the oligomer having a polyhydroxycarboxylic acid skeleton has a number average molecular weight (Mn) of 1,500 to 6,000. To make the resin have a high glass transition temperature, the inherent glass transition temperature of the hydroxycarboxylic acid is diminished in the resin. When the oligomer has a number average molecular weight (Mn) of 3,000, each polyhydroxycarboxylic acid skeleton, bound to each end of the aromatic diol, has an average polymerization degree of about 15, which is significantly smaller than the polymerization degree of 50 to 100 to which polymeric property is expressed. Therefore, the glass transition temperature of the resin is not that high as that of a resin consisting of 100% of polyhydroxycarboxylic acid.

Compared to a long-chain polymer prepared by reacting all monomers at once, the resin according to an embodiment, prepared by first preparing a short-chain polyhydroxycarboxylic acid using an aromatic monomer as an initiator and then elongating the polyhydroxycarboxylic acid, has more stable thermal property.

Since the resin randomly comprises the soft segments, the resin is partially flexible, which prevents deterioration of low-temperature fixability. For example, the polyhydroxycarboxylic acid skeleton obtained from lactic acid is hard and brittle. Therefore, by introduction of the soft segment, the resin is given proper flexibility. Toner particles comprising such a resin can be prevented from undesirably being pulverized into ultrafine particles or fusing on carrier particles while providing stable chargeability.

The soft segment is obtained from a soft material. The soft material is defined as a relatively softer material than the aromatic diol expressing a high glass transition temperature. Specific examples of usable soft materials include, but are not limited to, an aliphatic ester, an aliphatic ether, an aliphatic silicone, and an aliphatic straight-chain diol having a carbon number of 5 or more. In some embodiments, the soft segment comprises a polymer, and the polymer has a glass transition temperature of 0° C. or less in view of low-temperature fixability.

Specific examples of the aliphatic ester include, but are not limited to, polycaprolactone, polyethylene succinate, polybutylene succinate, poly(ethylene adipate) glycol, poly(butylene-1,4-adipate) glycol, and polyglycolic acid. In one or more embodiments, polycaprolactone is used in view of low-temperature fixability.

Specific examples of the aliphatic ether include, but are not limited to, poly(alkylene oxide) glycols such as poly(tetramethylene oxide) glycol, poly(ethylene oxide) glycol, poly(1,2-propylene oxide) glycol, poly(1,3-propylene oxide) glycol, poly(1,4-butylene oxide) glycol, copolymer of ethylene oxide and propylene oxide, and copolymer of ethylene oxide and tetrahydrofuran. In one or more embodiments, poly(tetramethylene oxide) glycol is used in view of low-temperature fixability.

Specific examples of the aliphatic silicone include, but are not limited to, polydimethylsiloxane, dual-end-silanol-modified silicone, dual-end-carboxyl-modified silicone, and dual-end-carbinol-modified silicone. In one or more embodiments, dual-end-carbinol-modified silicone is used in view of low-temperature fixability.

Specific examples of the aliphatic straight-chain diol having a carbon number of 5 or more include, but are not limited to, 1,6-hexanediol, 1,9-nonanediol, and 1,12-dodecanediol. When the carbon number is 5 or less, the resin is poorly flexible and low-temperature fixability is not expressed.

In some embodiments, the content of the soft segment in the resin is 4 to 18% by weight. When the content is less than 4% by weight, it is likely that the molecular chains are still restricted from movement due to strong interaction therebetween, thereby degrading low-temperature fixability. When the content is greater than 18% by weight, the resin is too soft and the grass transition temperature is too low, thereby degrading heat-resistant storage stability. When the resin is too soft, the toner particles may fuse on carrier particles while being agitated in a developing unit, degrading charge stability.

In some embodiments, the resin has a number average molecular weight (Mn) of 7,000 to 30,000. When Mn is greater than 30,000, the minimum fixable temperature may undesirably increase. When Mn is less than 7,000, the maximum fixable temperature may undesirably increase and storage stability may deteriorate.

The elongating agent is a compound having two functional groups reactive with hydroxyl group. Specific examples of such compounds include, but are not limited to, isocyanate compounds, glycidyl compounds, carbodiimide compounds, and vinyl compounds.

An isocyanate compound forms a urethane bond with a hydroxyl group. Thus, when an isocyanate compound is used as the elongating agent, the resin has an improved stiffness due to interaction between urethane bonds present in respective molecular chains. Specific examples of the isocyanate compound include, but are not limited to, difunctional isocyanate compounds such as isophorone diisocyanate (IPDI), hexamethylene diisocyanate (HDI), lysine diisocyanate, xylene diisocyanate, tolylene diisocyanate, diphenylmethane diisocyanate, and cyclohexane diisocyanate. In some embodiments, IPDI is used in view of reactivity.

The elongation reaction may be caused at a temperature lower than the boiling point of the solvent in use. In some embodiments, the used amount of the elongating agent is 6 to 25% by weight or 10 to 20% by weight based on the resulting resin. When the used amount is less than 6% by weight, the resulting resin may not achieve desired properties. When the used amount is greater than 25% by weight, the unreacted elongating agent may remain in the resulting resin, which is undesirable.

In some embodiments, the resin has a glass transition temperature (Tg) of 57° C. or more and a deformation temperature of 50° C. or more. The deformation temperature is determined by a compression test at 90% RH. When the deformation temperature at 90% RH is less than 50° C., even when Tg is 57° C. or more, the resulting toner particles or images may undesirably coalesce with each other when stored for long periods during summer or during land or ship transportation.

In some embodiments, an optically-active monomer, such as lactic acid, is used as the hydroxycarboxylic acid. The optically-active monomer has an optical purity X (% by mol), represented by the following formula, of 80% by mol or less or 60% by mol or less. When the optical purity is 80% by mol or less, solvent solubility and transparency of the resin improve.

Optical purity $X$(% by mol)=$|X(L\text{-form})-X(D\text{-form})|$ wherein X(L-form) and X(D-form) represent ratios (% by mol) of L-form and D-form optically-active monomers, respectively.

The optical purity X can be measured as follows. First, mix an analyte (e.g., a resin or toner having a polyester skeleton) with a mixture solvent of pure water, 1N sodium hydroxide, and isopropyl alcohol and agitate the mixture at 70° C. to cause hydrolysis. Next, filter the mixture to remove solid components and add sulfuric acid to neutralize the filtrate. Thus, an aqueous solution containing L-form and/or D-form monomers (e.g., L-form and/or D-form lactic acids), which are decomposition products of the analyte (e.g., the polyester resin), is obtained. Subject the aqueous solution to a measurement with a high-speed liquid chromatography (HPLC) equipped with chiral ligand exchangeable columns SUMICHRAL OA-5000 (from Sumika Analysis Chemical Service, Ltd.). Determine peak areas S(L) and S(D) corresponding to L-form monomer (e.g., L-lactic acid) and D-form monomer (e.g., D-lactic acid), respectively, from the resulting chromatogram. The optical purity X is calculated from the peak areas as follows.

$X(L\text{-form})$(% by mol)=$100 \times S(L)/\{S(L)+S(D)\}$ $X(D\text{-form})$(% by mol)=$100 \times S(D)/\{S(L)+S(D)\}$ Optical purity $X$(% by mol)=$|X(L\text{-form})-X(D\text{-form})|$ L-form and D-form monomers are optical isomers. Optical isomers are equivalent in physical and chemical properties as well as polymerization reactivity, except for optical properties. Thus, X(D-から) and X(L-form) are respectively equivalent to the ratios of D-form and L-form monomers used for forming the hydroxycarboxylic acid skeleton. The optical purity X (% by mol) of the hydroxycarboxylic acid skeleton can be controlled by the use of racemic mixture of L-form and D-form monomers.

To accelerate the reaction, esterification or urethanation catalysts, such as amine compounds, tin compounds, and titanium compounds, may be used.

Various additives (e.g., thermal stabilizer, antioxidant, ultraviolet absorber, flame retardant, nonreactive hydrolysis inhibitor, light resistance improver, wax, lubricant, charge controlling agent, organic plasticizer, biodegradable thermoplastic resin, colorant, delustrant) may be added to the resin during and/or after the process of polymerization of the resin.

A toner according to an embodiment includes the resin according to an embodiment. The toner may be manufactured by various processes such as kneading-pulverization, emulsion aggregation, dissolution suspension, dissolution emulsification, suspension granulation, suspension polymerization, and ester elongation.

Kneading-pulverization process includes the first premixing step, the second melt-kneading step, the third pulverization step, and the fourth classification step. In the first premixing step, toner components such as a binder resin, a colorant, and a hydrophobized particle, are mixed under dry condition. The toner components may further include a release agent and charge controlling agent.

Usable mixers include, but are not limited to, Henschel-type mixers such as FM MIXER (from Mitsui Mining & Smelting Co., Ltd.), SUPER MIXER (from KAWATA MFG Co., Ltd.), and MECHANOMILL (from Okada Seiko Co., Ltd.); ONG MILL (from Hosokawa Micron Corporation); HYBRIDIZATION SYSTEM (from Nara Machinery); and COSMO SYSTEM (from Kawasaki Heavy Industries, Ltd.).

In the second melt-kneading step, the mixture prepared in the first premixing step is melt-kneaded. The mixture is melt-kneaded at a temperature not less than the softening point and less than the thermal decomposition temperature of the binder resin so that toner components other than the binder resin are dispersed in the melted or softened binder resin.

The melt-kneading may be performed using a kneader such as a double-axis extruder, a two-roll mill, a three-roll mill, or a labo plastomill. More specifically, single-axis or double-axis extruders such as TEM-100B (from Toshiba Machine Co., Ltd.) and PCM-65/87 and PCM-30 (both from Ikegai Co., Ltd.); and open roll kneaders such as MOS320-1800 and KNEADEX (both from Mitsui Mining & Smelting Co., Ltd.) are usable. The mixture may be kneaded using two or more of these kneaders.

In the third pulverization step, the melt-kneaded mixture prepared in the second melt-kneading step is solidified by cooling, and the solidified melt-kneaded mixture is further pulverized. First, the solidified melt-kneaded mixture is coarsely pulverized into coarse particles having a volume average particle diameter of about 100 µm to 5 mm by a hammer mill or a cutting mill. The coarse particles are further pulverized into fine particles having a volume average particle diameter of about 15 µm or less.

The fine pulverization may be performed by a jet-type pulverizer that uses supersonic jet air or an impact pulverizer that introduces samples into a space formed between a rotor rotating at a high speed and a stator. The solidified melt-kneaded mixture may be directly pulverized into fine particles by the jet-type pulverizer or impact pulverizer without going through coarse particles.

In the fourth classification step, the particles prepared in the third pulverization step are classified by size so that excessively-pulverized particles and oversized particles are removed. Such excessively-pulverized particles and oversized particles can be recycled for another toner manufacture. The classification may be performed by a swivel wind power classifier (rotary wind power classifier) that removes excessively-pulverized particles and oversized particles by centrifugal force and wind power. The classification condition is set so that toner particles having a volume average particle diameter of 3 to 15 µm are obtained.

Emulsification aggregation process includes the first aggregation step, the second adhesion step, and the third fusion step. In advance, binder resin particles are prepared by a typical emulsion polymerization, for example. In the first aggregation step, binder resin particles obtained by emulsion polymerization are dispersed in a solvent with an ionic surfactant. Other toner components, such as colorant, are dispersed in a solvent with another ionic surfactant having the opposite polarity. These dispersions are mixed to cause hetero aggregation. Thus, aggregated particles are formed.

In the second adhesion step, resin particles are optionally added and adhered to the surfaces of the aggregated particles so that a covering layer is formed on the aggregated particles. This process makes the resulting toner have a core-shell structure. In the third fusion step, the aggregated particles are fused with each other by being heated to a temperature equal to or above the highest glass transition point or melting point among the binder resins. Thereafter, the fused particles are washed and dried to obtain toner particles.

As described above, the second adhesion step is optional. In a case in which the adhesion step is employed, in the first aggregation step, initial amounts of ionic surfactants in respective dispersions are made unbalanced. The ionic surfactants are then ionically neutralized with an inorganic metal salt (e.g., calcium nitrate) or an inorganic metal salt polymer (e.g., polyaluminum chloride) to form and stabilize aggregated particles (i.e., core particles) at or below the glass transition point or melting point of the binder resin. In the adhesion step, additional binder resin particles are added and adhered to the surface of the core particles. The additional binder resin particles have been treated with a specific amount of a dispersant having a specific polarity so that the unbalance among the dispersions is compensated. Optionally, the core particles adhering the additional binder resin particles are slightly heated to a temperature equal to or below the glass transition point of the binder resin or additional binder resin and stabilized at a higher temperature, before being fused with each other by being heated to a temperature equal to or above the glass transition point of the additional binder resin. The adhesion step can be repeated for several times.

Dissolution suspension process includes the steps of dissolving toner components such as a binder resin, a colorant, and a release agent in an organic solvent (e.g., ethyl acetate); and dispersing the resulting solution in an aqueous medium with an inorganic fine particle (e.g., calcium phosphate) or an organic dispersant (e.g., polyvinyl alcohol, sodium polyacrylate) upon application of mechanical shearing force by a homogenizer such as TK HOMOMIXER.

The resulting dispersion is added to 1M hydrochloric acid aqueous solution so that the dispersants are dissolved and removed, and is further filtered so that solid components and liquid components are separated. Finally, the solvents remaining in the resulting particles are removed. Thus, toner particles are obtained.

Dissolution emulsification process includes the steps of dissolving a binder resin in an organic solvent (e.g., ethyl acetate); emulsifying the resulting solution by mechanical shearing force from a homogenizer such as TK HOMO- MIXER and surface activating force of ionic surfactants (e.g., sodium alkylbenzene sulfonate) to form binder resin particles; and removing residual solvent by reduced-pressure distillation, to obtain a dispersion of the binder resin particles. Succeeding steps are the same as the emulsion aggregation method described above.

Suspension granulation process includes the steps of preparing a polymer solution including a prepolymer having a weight average molecular weight (Mw) of 3,000 to 15,000 measured by GPC (gel permeation chromatography); adding toner components such as a colorant, a monomer, a polymerization initiator, and a release agent to the polymer solution; suspending the resulting solution upon application of mechanical shearing force in the presence of an inorganic or organic dispersant; and applying thermal energy to the resulting suspension upon application of agitation shearing force to prepare polymer particles.

When the prepolymer has a weight average molecular weight (Mw) of 3,000 to 15,000, the above solutions have a proper viscosity and the resulting toner has a proper fixing property. Additionally, the weight average molecular weight (Mw) of the binder resin included in the resultant toner is controllable without chain transfer agent.

Suspension polymerization process includes the steps of agitating a polymerizable mixture including a monomer, a polymerization initiator, a colorant, a release agent, etc. in an aqueous medium containing a suspension stabilizer, to prepare polymer particles. Alternatively, suspension polymerization process includes the steps of agitating a polymerizable mixture including a monomer, a polymerization initiator, a colorant, a release agent, and a cationic polymer, in an aqueous medium containing an anionic dispersant, to prepare polymer particles. The resulting toner has a configuration such that the release agent is encapsulated in the suspending particle. Thus, this toner has improved fixability and offset resistance.

Ester elongation process includes the steps of emulsifying a toner components liquid including at least a binder resin and forming toner particles. More specifically, the ester elongation process may include the following four steps.

In the first step, a toner components liquid is prepared by dissolving or dispersing toner components such as a colorant and a binder resin in an organic solvent. The organic solvent is removed during or after the process of forming toner particles.

In the second step, an aqueous medium is prepared by dispersing a dispersion stabilizer, such as resin particles, in water, a water-miscible solvent, dimethylformamide, tetrahydrofuran, a cellosolve, a lower ketone, or a mixture thereof. The added amount of the resin particles may be, for example, 0.5 to 10% by weight.

The resin particles may be comprised of a resin capable of forming an aqueous dispersion thereof. Specific examples of such resins include, but are not limited to, thermoplastic and thermosetting resins such as vinyl resin, polyurethane resin, epoxy resin, polyester resin, polyamide resin, polyimide resin, silicone resin, phenol resin, melamine resin, urea resin, aniline resin, ionomer resin, and polycarbonate resin. Two or more of these resins can be used in combination. In some embodiments, a vinyl resin, a polyurethane resin, an epoxy resin, a polyester resin, or a combination thereof is used because they are easy to form an aqueous dispersion of fine spherical particles thereof.

The aqueous medium may include a dispersant for the purpose of stabilizing liquid droplets to be formed when the toner components liquid is emulsified in the aqueous medium, to obtain toner particles with a desired shape and a narrow particle size distribution. The dispersant may be, for example, a surfactant, a poorly-water-soluble inorganic compound, or a polymeric protection colloid. Two or more of these materials can be used in combination. In one or more embodiments, a surfactant is used.

In the third step, the toner components liquid is emulsified in the aqueous medium while being agitated. Specific instruments usable for the emulsification include, but are not limited to, batch emulsifiers such as HOMOGENIZER (from IKA Japan), POLYTRON® (from KINEMATICA AG), and TK AUTO HOMO MIXER® (from PRIMIX Corporation); continuous emulsifiers such as EBARA MILDER® (from Ebara Corporation), TK FILMICS® (from PRIMIX Corporation), TK PIPELINE HOMO MIXER® (from PRIMIX Corporation), colloid mill (from SHINKO PANTEC CO., LTD.), slasher, trigonal wet pulverizer (from Mitsui Miike Machinery Co., Ltd.), CAVITRON® (from Eurotec), and FINE FLOW MILL® (from Pacific Machinery & Engineering Co., Ltd.); high-pressure emulsifiers such as MICROFLUIDIZER (from Mizuho Industrial Co., Ltd.), NANOMIZER (from NANOMIZER Inc.), and APV GAULIN(SPX Corporation); film emulsifier (from REICA Co., Ltd.); vibration emulsifiers such as VIBRO MIXER (from REICA Co., Ltd.); and ultrasonic emulsifiers such as ultrasonic homogenizer (from BRANSON). In one or more embodiments, APV GAULIN, HOMOGENIZER, TK AUTO HOMO MIXER®, EBARA MILDER®, TK FILMICS®, or TK PIPELINE HOMO MIXER® is used in view of uniform particle diameter.

When the toner components liquid includes a modified polyester reactive with a compound having an active hydrogen group (hereinafter "prepolymer") as a binder resin, the prepolymer reacts as the emulsification proceeds. In some embodiments, the reaction time between the prepolymer and the compound having an active hydrogen group is 10 minutes to 40 hours or 2 to 24 hours.

In the fourth step, the organic solvent is removed from the emulsion slurry. The organic solvent can be removed from the emulsion by (1) gradually heating the emulsion to completely evaporate the organic solvent from liquid droplets or (2) spraying the emulsion into dry atmosphere to completely evaporate the organic solvent from liquid droplets. In the latter case, aqueous dispersants, if any, can also be evaporated.

The toner may further include additives such as charge controlling agent, shape controlling agent, release agent, inorganic fine particle, fluidity improving agent, cleanability improving agent, and magnetic material.

Charge controlling agents are adapted to control chargeability of toner. Specific examples of usable charge controlling agents include, but are not limited to, nigrosine dyes, azine dyes having an alkyl group having 2 to 16 carbon atoms described in Examined Japanese Application Publication No. 42-1627; basic dyes (e.g., C.I. Basic Yellow 2 (C.I. 41000), C.I. Basic Yellow 3, C.I. Basic Red 1 (C.I. 45160), C.I. Basic Red 9 (C.I. 42500), C.I. Basic Violet 1 (C.I. 42535), C.I. Basic Violet 3 (C.I. 42555), C.I. Basic Violet 10 (C.I. 45170), C.I. Basic Violet 14 (C.I. 42510), C.I. Basic Blue 1 (C.I. 42025), C.I. Basic Blue 3 (C.I. 51005), C.I. Basic Blue 5 (C.I. 42140), C.I. Basic Blue 7 (C.I. 42595), C.I. Basic Blue 9 (C.I. 52015), C.I. Basic Blue 24 (C.I. 52030), C.I. Basic Blue 25 (C.I. 52025), C.I. Basic Blue 26 (C.I. 44045), C.I. Basic Green 1 (C.I. 42040), C.I. Basic Green 4 (C.I. 42000)) and lake pigments thereof; quaternary ammonium salts (e.g., C.I. Solvent Black 8 (C.I. 26150), benzoylmethylhexadecyl ammonium chloride, decyltrimethyl chloride); dialkyl (e.g., dibutyl, dioctyl) tin compounds; dialkyl tin borate compounds; guanidine derivatives; polyamine resins (e.g., vinyl polymers having amino group, condensed polymers having amino group); metal complex salts of monoazo dyes described in Examined Japanese Application Publication Nos. 41-20153, 43-27596, 44-6397, and 45-26478; metal complexes of salicylic acid, dialkyl salicylic acid, naphthoic acid, and dicarboxylic acid with Zn, Al, Co, Cr, and Fe, described in Examined Japanese Application Publication Nos. 55-42752 and 59-7385; sulfonated copper phthalocyanine pigments; organic boron salts; fluorine-containing quaternary ammonium salts; and calixarene compounds. Two or more of these materials can be used in combination.

In some embodiments, the toners having colors other than black include a white metal salt of a salicylic acid derivative.

In some embodiments, the content of the charge controlling agent is 0.01 to 2 parts by weight or 0.02 to 1 part by weight based on 100 parts of the binder resin. When the content of the charge controlling agent is 0.01 parts by weight or more, good charge controllability is provided. When the content of charge controlling agent is 2 parts by weight or less, the toner is not excessively charged nor excessively electrostatically attracted to a developing roller, preventing deterioration of fluidity and image density while keeping good charge controllability.

Shape controlling agents are adapted to control the shape of toner. Specific materials usable as the shape controlling agent include, but are not limited to, layered inorganic minerals in which at least a part of interlayer ions are modified with an organic ion (hereinafter "modified layered inorganic minerals"). Specific examples of such modified layered inorganic minerals include, but are not limited to, organic-cation-modified smectite-based materials. Metal anions can be introduced to a layered inorganic mineral by replacing a part of divalent metals with trivalent metals. In this case, at least a part of the introduced metal anions may be modified with an organic anion so as not to increase hydrophilicity of the layered inorganic mineral.

Specific materials usable as the organic cation modifying agent include, but are not limited to, quaternary alkyl ammonium salts, phosphonium salts, and imidazolium salts. In one or more embodiments, quaternary alkyl ammonium salts are used. Specific examples of the quaternary alkyl ammonium salts include, but are not limited to, trimethyl stearyl ammonium, dimethyl stearyl benzyl ammonium, and oleylbis(2-hydroxyethyl)methyl ammonium.

Specific materials usable as the organic cation modifying agent further include, but are not limited to, sulfates, sulfonates, carboxylates, and phosphates having a branched, non-branched, or cyclic alkyl (C1-C44), alkenyl (C1-C22), alkoxy (C8-C32), hydroxyalkyl (C2-C22), ethylene oxide, or propylene oxide. In one or more embodiments, carboxylic acids having an ethylene oxide skeleton are used.

The modified layered inorganic mineral has proper hydrophilicity due to the modification by the organic ion. A toner components liquid including such a modified layered inorganic mineral expresses non-Newtonian viscosity, which is capable of controlling or varying the resulting toner shape.

Specific examples of the modified layered inorganic minerals include, but are not limited to, montmorillonite, bentonite, hectorite, attapulgite, sepiolite, and mixtures thereof. In some embodiments, an organic-modified montmorillonite or bentonite is used. They can easily control viscosity of the toner components liquid at a small amount without adversely affecting other toner properties.

In some embodiments, the content of the modified layered inorganic mineral in the toner is 0.05 to 10% by weight or 0.05 to 5% by weight.

Specific examples of commercially available organic-cation-modified layered inorganic minerals include, but are not limited to, quaternium 18 bentonite such as BENTONE® 3, BENTONE® 38, and BENTONE® 38V (from Rheox), TIXOGEL VP (from United Catalyst), and CLAYTONE® 34, CLAYTONE® 40, and CLAYTONE® XL (from Southern Clay Products); stearalkonium bentonite such as BENTONE® 27 (from Rheox), TIXOGEL LG (from United Catalyst), and CLAYTONE® AF and CLAYTONE® APA (from Southern Clay Products); and quaternium 18/benzalkonium bentonite such as CLAYTONE® HT and CLAYTONE® PS (from Southern Clay Products). In some embodiments, CLAYTONE® AF or CLAYTONE® APA is used.

Specific examples of commercially available oranic-anion-modified layered inorganic minerals include, but are not limited to, HITENOL 330T (from Dai-ichi Kogyo Seiyaku Co., Ltd.) obtainable by modifying DHT-4A (from Kyowa Chemical Industry Co., Ltd.) with an organic anion represented by the following formula:

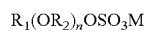

$$R_1(OR_2)_nOSO_3M$$

wherein $R_1$ represents an alkyl group having 13 carbon atoms, $R_2$ represents an alkylene group having 2 to 6 carbon atoms, n represents an integer of 2 to 10, and M represents a monovalent metal element.

Specific examples of usable colorants include, but are not limited to, carbon black, Nigrosine dyes, black iron oxide, NAPHTHOL YELLOW S, HANSA YELLOW (10G, 5G and G), Cadmium Yellow, yellow iron oxide, loess, chrome yellow, Titan Yellow, polyazo yellow, Oil Yellow, HANSA YELLOW (GR, A, RN and R), Pigment Yellow L, BENZIDINE YELLOW (G and GR), PERMANENT YELLOW (NCG), VULCAN FAST YELLOW (5G and R), Tartrazine Lake, Quinoline Yellow Lake, ANTHRAZANE YELLOW BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, PERMANENT RED (F2R, F4R, FRL, FRLL and F4RH), Fast Scarlet VD, VULCAN FAST RUBINE B, Brilliant Scarlet G, LITHOL RUBINE GX, Permanent Red FSR, Brilliant Carmine 6B, Pigment Scarlet 3B, Bordeaux 5B, Toluidine Maroon, PERMANENT BORDEAUX F2K, HELIO BORDEAUX BL, Bordeaux 10B, BON MAROON LIGHT, BON MAROON MEDIUM, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, INDANTHRENE BLUE (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, and lithopone. Two or more of these materials can be used in combination.

Usable colorants are not limited in its color. The toner may include either a black, cyan, magenta, or yellow colorant or a combination thereof.

Specific examples of usable black colorants include, but are not limited to, carbon blacks such as furnace black, lamp black (C.I. Pigment Black 7), acetylene black, and channel black; metals such as copper, iron (C.I. Pigment Black 11), and titanium oxide; and organic pigments such as aniline black (C.I. Pigment Black 1).

Specific examples of usable magenta colorants include, but are not limited to, C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 48:1, 49, 50, 51, 52, 53, 53:1, 54, 55, 57, 57:1, 58, 60, 63, 64, 68, 81, 83, 87, 88, 89, 90, 112, 114, 122, 123, 163, 177, 179, 202, 206, 207, 209, and 211; C.I. Pigment Violet 19; and C.I. Vat Red 1, 2, 10, 13, 15, 23, 29, and 35.

Specific examples of usable cyan colorants include, but are not limited to, C.I. Pigment Blue 2, 3, 15, 15:1, 15:2, 15:3, 15:4, 15:6, 16, 17, and 60; C.I. Vat Blue 6; C.I. Acid Blue 45; copper phthalocyanine pigments having a phthalocyanine skeleton substituted with 1 to 5 phthalimidemethyl groups; and Green 7 and Green 35.

Specific examples of usable yellow colorants include, but are not limited to, C.I. Pigment Yellow 0-16, 1, 2, 3, 4, 5, 6, 7, 10, 11, 12, 13, 14, 15, 16, 17, 23, 55, 65, 73, 74, 83, 97, 110, 151, 154, and 180; C.I. Vat Yellow 1, 2, and 20; and Orange 36.

In some embodiments, the content of the colorant in the toner is 1 to 15% by weight or 3 to 10% by weight. When the colorant content is less than 1% by weight, coloring power of the toner may be poor. When the colorant content is greater than 15% by weight, coloring power and electric property of the toner may be poor because the colorant cannot be uniformly dispersed in the toner.

The colorant can be combined with a resin to be used as a master batch. Specific examples of usable resins include, but are not limited to, polyester, polymers of styrene or styrene derivatives, styrene-based copolymers, polymethyl methacrylate, polybutyl methacrylate, polyvinyl chloride, polyvinyl acetate, polyethylene, polypropylene, epoxy resin, epoxy polyol resin, polyurethane, polyamide, polyvinyl butyral, polyacrylic acid resin, rosin, modified rosin, terpene resin, aliphatic or alicyclic hydrocarbon resin, aromatic petroleum resin, chlorinated paraffin, and paraffin wax. Additionally, polyester resins having a polyhydroxycarboxylic acid skeleton are also usable. Such resins are plant-derived and adapted to improve solubility. Two or more of these resins can be used in combination.

The master batch can be obtained by mixing and kneading a resin and a colorant while applying a high shearing force. To increase the interaction between the colorant and the resin, an organic solvent may be used. More specifically, the maser batch can be obtained by a method called flushing in which an aqueous paste of the colorant is mixed and kneaded with the resin and the organic solvent so that the colorant is transferred to the resin side, followed by removal of the organic solvent and moisture. This method is advantageous in that the resulting wet cake of the colorant can be used as it is without being dried. When performing the mixing or kneading, a high shearing force dispersing device such as a three roll mill may be used.

Specific materials usable as the release agent include, but are not limited to, wax. Specific examples of usable waxes include, but are not limited to, free-fatty-acid-free carnauba wax, polyethylene wax, montan wax, oxidized rice wax, and combinations thereof.

In some embodiments, a microcrystalline carnauba wax having an acid value of 5 or less, which can be dispersed in the binder resin with a dispersion diameter of 1 μm or less, is used. In some embodiments, a microcrystalline montan wax, obtained by purifying a mineral, having an acid value of 5 to 14 is used. In embodiments, a oxidized rice wax, obtained by oxidizing a rice bran wax with air, having an acid value of 10 to 30 is used. These waxes can be finely dispersed in the resin according to an embodiment, which can provide a toner having a good combination of hot offset resistance, transferability, and durability. Two or more kinds of the above waxes can be used in combination.

Specific materials usable as the release agent further include, but are not limited to, solid silicone wax, higher fatty acid higher alcohol, montan ester wax, polyethylene wax, polypropylene wax, and combinations thereof.

In one or more embodiments, the release agent has a glass transition temperature (Tg) of 70 to 90° C. When Tg is less than 70° C., heat-resistant storage stability of the toner may be poor. When Tg is greater than 90° C., cold-offset resistance of the toner may be poor, i.e., the toner may not be releasable at low temperatures and undesirably winds around a fixing member.

In one or more embodiments, the content of the release agent in the toner is 1to 20% by weight or 3 to 10% by weight. When the content of the release agent is less than 1% by weight, offset resistance of the toner may be poor. When the content of the release agent is greater than 20% by weight, transferability and durability of the toner may be poor.

The toner may further include inorganic fine particles on the surface thereof to improve fluidity, developability, and chargeability. Specific examples of usable inorganic fine particles include, but are not limited to, silica, alumina, titanium oxide, barium titanate, magnesium titanate, calcium titanate, strontium titanate, zinc oxide, tin oxide, quartz sand, clay, mica, sand-lime, diatom earth, chromium oxide, cerium oxide, red iron oxide, antimony trioxide, magnesium oxide, zirconium oxide, barium sulfate, barium carbonate, calcium carbonate, silicon carbide, and silicon nitride. Two or more of these materials can be used in combination.

In some embodiments, the inorganic fine particles have a primary particle diameter of 5 nm to 2 μm or 5 nm to 500 nm.

In some embodiments, the content of the inorganic fine particles in the toner is 0.01 to 5.0% by weight or 0.01 to 2.0% by weight. Within the above range, fluidity, developability, and chargeability of the toner are improved.

Fluidity improving agents are adapted to improve hydrophobicity of toner by surface treatment so as to prevent deterioration of fluidity and chargeability in high-humidity conditions. Specific materials usable as the fluidity improving agent include, but are not limited to, silane coupling agents, silylation agents, silane coupling agents having a fluorinated alkyl group, organic titanate coupling agents, aluminum coupling agents, silicone oils, and modified silicone oils. The above-described silica and titanium oxide particles can also be hydrophobized with the fluidity improving agent.

Cleanability improving agents are adapted to improve removability of toner from a photoreceptor or primary transfer medium. Specific materials usable as the cleanability improving agent include, but are not limited to, metal salts of fatty acids (e.g., zinc stearate, calcium stearate) and fine particles of polymers prepared by soap-free emulsion polymerization (e.g., polymethyl methacrylate, polystyrene). In some embodiments, the fine particles of polymers have a narrow size distribution and a volume average particle diameter of 0.01 to 1 μm.

Specific examples of usable magnetic materials include, but are not limited to, iron powder, magnetite, and ferrite. In some embodiments, a magnetic material having a whitish color is used.

A developer according to an embodiment includes the above-described toner according to an embodiment and other components such as a carrier. The developer may be either a one-component developer or a two-component developer.

The two-component developer is compatible with high-speed printers, in accordance with recent improvement in information processing speed, owing to its long lifespan.

In some embodiments, the two-component developer includes the toner in an amount of 1 to 10 parts by weight based on 100 parts by weight of the carrier.

The carrier may comprise a core material and a resin layer that covers the core material.

Specific examples of usable core materials include, but are not limited to, manganese-strontium (Mn—Sr) and manganese-magnesium (Mn—Mg) materials having a magnetization of 50 to 90 emu/g. High magnetization materials such as iron powders having a magnetization of 100 emu/g or more and magnetites having a magnetization of 75 to 120 emu/g are suitable for improving image density. Additionally, low magnetization materials such as copper-zinc (Cu—Zn) materials having a magnetization of 30 to 80 emu/g are suitable for producing a high-quality image, because carriers made of such materials can weakly contact a photoreceptor. Two or more of these materials can be used in combination.

In some embodiments, the core material has a weight average particle diameter (D50) of 10 to 200 μm or 40 to 100 μm. When D50 is less than 10 μm, it means that the resulting carrier particles include a relatively large amount of fine particles and therefore the magnetization per carrier particle is too low to prevent the carrier particles from scattering. When D50 is greater than 200 μm, it means that the specific surface area of the carrier particle is too small to prevent toner particles from scattering. Therefore, solid portions in full-color images may not be reliably reproduced.

Specific examples of usable resins for the resin layer include, but are not limited to, amino resins, polyvinyl resins, polystyrene resins, halogenated olefin resins, polyester resins, polycarbonate resins, polyethylene resins, polyvinyl fluoride resins, polyvinylidene fluoride resins, polytrifluoroethylene resins, polyhexafluoropropylene resins, vinylidene fluoride-acrylic monomer copolymer, vinylidene fluoride-vinyl fluoride copolymer, tetrafluoroethylene-vinylidene fluoride-non-fluoride monomer terpolymer, and silicone resins. Two or more of these resins can be used in combination. In one or more embodiments, a silicone resin is used in view of prevention of formation of toner film on carrier particles.

The silicone resin may be, for example, a straight silicone resin consisting of organosiloxane bonds; or a alkyd-modified, polyester-modified, epoxy-modified, acrylic-modified, or urethane-modified silicone resin.

Specific examples of commercially available silicone resins include, but are not limited to, KR271, KR255, and KR152 (from Shin-Etsu Chemical Co., Ltd.); and SR2400, SR2406, and SR2410 (from Dow Corning Toray Co., Ltd.).

Specific examples of commercially available modified silicone resins include, but are not limited to, KR206 (alkyd-modified), KR5208 (acrylic-modified), ES1001N (epoxy-modified), and KR305 (urethane-modified) (from Shin-Etsu Chemical Co., Ltd.); and SR2115 (epoxy-modified) and SR2110 (alkyd-modified) (from Dow Corning Toray Co., Ltd.).

The silicone resin can be used alone or in combination with other components such as a cross-linkable component and a charge controlling component.

The resin layer may include a conductive powder such as metal, carbon black, titanium oxide, tin oxide, and zinc oxide. In some embodiments, the conductive powder has a volume average particle diameter of 1 μm or less. When the volume average particle diameter is greater than 1 μm, it may be difficult to control electric resistivity of the resin layer.

The resin layer can be formed by, for example, dissolving a resin (e.g., a silicone resin) in an organic solvent to prepare a coating liquid, and uniformly applying the coating liquid on the surface of the core material, followed by drying and baking. The coating method may be, for example, dip coating, spray coating, or brush coating.

Specific examples of usable organic solvents include, but are not limited to, toluene, xylene, methyl ethyl ketone, methyl isobutyl ketone, cellosolve, and butyl acetate.

The baking method may be either an external heating method or an internal heating method that uses a stationary electric furnace, a fluid electric furnace, a rotary electric furnace, a burner furnace, or microwave.

In some embodiments, the content of the resin layer in the carrier is 0.01 to 5.0% by weight. When the content of the resin layer is less than 0.01% by weight, it means that the resin layer cannot be uniformly formed on the core material. When the content of the resin layer is greater than 5.0% by weight, it means that the resin layer is so thick that each carrier particles are fused with each other.

An image forming method according to an embodiment includes at least an electrostatic latent image forming process, a developing process, a transfer process, and a fixing process. The image forming method may optionally include other processes such as a neutralization process, a cleaning process, a recycle process, and a control process, if needed.

An image forming apparatus according to an embodiment includes at least an electrostatic latent image bearing member, an electrostatic latent image forming device, a developing device, a transfer device, and a fixing device. The image forming apparatus may optionally include other members, such as a neutralizer, a cleaner, a recycler, and a controller, if needed.

The electrostatic latent image forming process is a process which forms an electrostatic latent image on an electrostatic latent image bearing member. The electrostatic latent image bearing member (hereinafter may be referred to as "electrophotographic photoreceptor" or "photoreceptor") is not limited in material, shape, structure, and size. In some embodiments, the electrostatic latent image bearing member has a drum-like shape and is comprised of an inorganic photoconductor, such as amorphous silicone or selenium, or an organic photoconductor, such as polysilane or phthalopolymethyne. Amorphous silicone is advantageous in terms of long lifespan.

In the electrostatic latent image forming process, an electrostatic latent image forming device uniformly charges a surface of the electrostatic latent image bearing member and irradiates the charged surface with light containing image information. The electrostatic latent image forming device comprises a charger for uniformly charging a surface of the electrostatic latent image bearing member and an irradiator for irradiating the charged surface with light containing image information.

The charger is adapted to charge a surface of the electrostatic latent image bearing member by supplying a voltage thereto. The charger may be, for example, a contact charger equipped with a conductive or semiconductive roll, brush, film, or rubber blade, or a non-contact charger such as corotron and scorotron that use corona discharge. In some embodiments, the charger is disposed in contact or non-contact with the electrostatic latent image bearing member so as to supply an AC-DC superimposed voltage to a surface of the electrostatic latent image bearing member. In some embodiments, the charger is a non-contact charging roller disposed proximal to the electrostatic latent image bearing member, adapted to supply an AC-DC superimposed voltage to a surface of the electrostatic latent image bearing member.

The irradiator is adapted to irradiate the charged surface of the electrostatic latent image bearing member with light containing image information. The irradiator may be, for example, a radiation optical type, a rod lens array type, a laser optical type, or a liquid crystal shutter optical type. The electrostatic latent image bearing member may be irradiated with light from the reverse surface (back surface) side thereof.

The developing process is a process which develops the electrostatic latent image into a toner image that is visible with the toner or developer according to an embodiment. The developing device is adapted to develop the electrostatic latent image into a toner image with the toner or developer according to an embodiment. In some embodiments, the developing device includes a developing unit adapted to store and supply the toner or developer to the electrostatic latent image with or without contacting the electrostatic latent image.

The developing device may employ either a dry developing method or a wet developing method. The developing device may be either a single-color developing device or a multi-color developing device. The developing device may be comprised of an agitator for frictionally agitating and charging the developer and a rotatable magnet roller.

In these embodiments, toner particles and carrier particles are mixed and agitated within the developing device so that the toner particles are frictionally charged. The charged toner particles and carrier particles are borne on the surface of the magnet roller forming chainlike aggregations (hereinafter "magnetic brush"). The magnet roller is disposed adjacent to the electrostatic latent image bearing member. Therefore, a part of the toner particles in the magnetic brush migrates from the surface of the magnet roller to the surface of the electrostatic latent image bearing member due to electrical attractive force. As a result, the electrostatic latent image formed on the electrostatic latent image bearing member is developed into a toner image.

The transfer process is a process that transfers the toner image onto a recording medium. In some embodiments, the toner image is primarily transferred onto an intermediate transfer medium and secondarily transferred onto the recording medium. In some embodiments, a plurality of toner images with different colors is primarily transferred onto the intermediate transfer medium to form a composite toner image and the composite toner image is secondarily transferred onto the recording medium. The toner image may be transferred from the electrostatic latent image bearing member upon charging of the electrostatic latent image bearing member by a transfer charger. In some embodiments, the transfer device includes a plurality of primary transfer devices each adapted to transfer a toner image onto the intermediate transfer medium to form a composite toner image, and a secondary transfer device adapted to transfer the composite toner image onto the recording medium. The intermediate transfer medium may be, for example, a transfer belt.

In some embodiments, each transfer device (including the primary transfer device and the secondary transfer device) contains a transfer unit adapted to separate a toner image from the electrostatic latent image bearing member toward a recording medium side. The number of transfer devices is not limited, i.e., one or more. The transfer unit may be, for example, a corona discharger, a transfer belt, a transfer roller, a pressure transfer roller, or an adhesive transfer unit. The recording medium is not limited to a specific material, and any kind of material can be used as the recording medium.

The fixing process is a process which fixes the toner image on a recording medium. Each single-color toner image may be independently fixed on a recording medium, or alternatively, a composite toner image including a plurality of color toner images may be fixed on a recording medium at once. In some embodiments, the fixing device includes fixing members adapted to fix a toner image by application of heat and pressure. For example, the fixing device may include a combination of a heating roller and a pressing roller, or a combination of a heating roller, a pressing roller, and an endless belt. In some embodiments, the fixing device includes a heater equipped with a heating element, a film in contact with the heater, and a pressing member pressed against the heater with the film therebetween. Such a fixing device is adapted to pass a recording medium having a toner image thereon between the film and the pressing member so that the toner image is fixed on the recording medium upon application of heat and pressure. In some embodiments, the heating member is heated to a temperature of 80 to 200° C. In the fixing process, an optical fixer can be used in place of or in combination with the fixing device.

The neutralization process is a process in which the neutralizer neutralizes the electrostatic latent image bearing member by supplying a neutralization bias thereto. The neutralizer may be, for example, a neutralization lamp.

The cleaning process is a process in which the cleaner removes residual toner particles remaining on the electrostatic latent image bearing member. The cleaner may be, for example, a magnetic brush cleaner, an electrostatic brush cleaner, a magnetic roller cleaner, a blade cleaner, a brush cleaner, or a web cleaner.

The recycle process is a process in which the recycler supplies the residual toner particles collected in the cleaning process to the developing device. The recycler may be, for example, a conveyer.

The control process is a process in which the controller controls the above-described processes. The controller may be, for example, a sequencer or a computer.

FIG. 1 is a schematic view of an image forming apparatus according to an embodiment. An image forming apparatus 100A includes a photoreceptor drum 10 serving as the electrostatic latent image bearing member, a charging roller 20, an irradiator 30, a developing device 45, an intermediate transfer medium 50, a cleaning device 60, and a neutralization lamp 70.

An intermediate transfer medium 50 is a seamless belt stretched taut with three rollers 51 and is movable in a direction indicated by arrow in FIG. 1. One of the three rollers 51 is adapted to supply a primary transfer bias to the intermediate transfer medium 50. A cleaner 90 is disposed adjacent to the intermediate transfer medium 50. A transfer roller 80 is disposed facing the intermediate transfer medium 50. The transfer roller 80 is adapted to supply a secondary transfer bias for transferring a toner image onto a recording medium 95. A corona charger 58 is disposed facing the intermediate transfer medium 50 between the contact points of the intermediate transfer medium 50 with the photoreceptor drum 10 and the recording medium 95 with respect to the direction of rotation of the intermediate transfer medium 50. The corona charger 58 is adapted to give charge to the toner image on the intermediate transfer medium 50.

The developing device 45 includes a black developing unit 45K, an yellow developing unit 45Y, a magenta developing unit 45M, and a cyan developing unit 45C. The black developing unit 45K includes a developer container 42K, a developer supply roller 43K, and a developing roller 44K. The yellow developing unit 44Y includes a developer container 42Y, a developer supply roller 43Y, and a developing roller 44Y. The magenta developing unit 45M includes a developer container 42M, a developer supply roller 43M, and a developing roller 44M. The cyan developing unit 45C includes a developer container 42C, a developer supply roller 43C, and a developing roller 44C.

In the image forming apparatus 100A, the charging roller 20 uniformly charges the photoreceptor 10. The irradiator 30 irradiates the photoreceptor 10 with light containing image information to form an electrostatic latent image thereon. The developing device 45 supplies toner to the electrostatic latent image formed on the photoreceptor 10 to form a toner image. The toner image is primarily transferred onto the intermediate transfer medium 50 by a voltage supplied from the roller 51 and is secondarily transferred onto the recording medium 95. Residual toner particles remaining on the photoreceptor 10 are removed by the cleaning device 60. The photoreceptor 10 is neutralized by the neutralization lamp 70.

Figure 2:
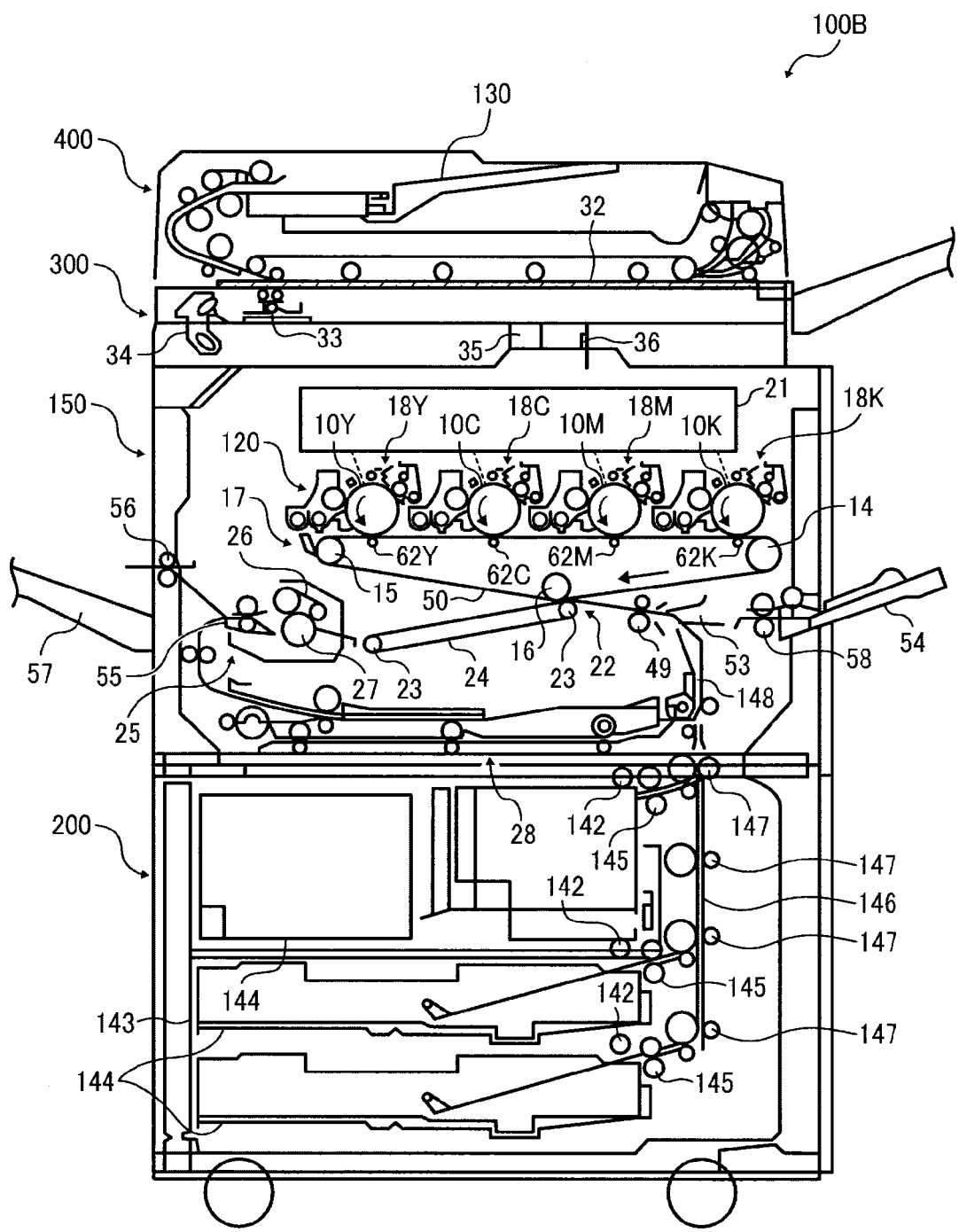
FIG. 2 is a schematic view of an image forming apparatus according to another embodiment.
Figure 3:
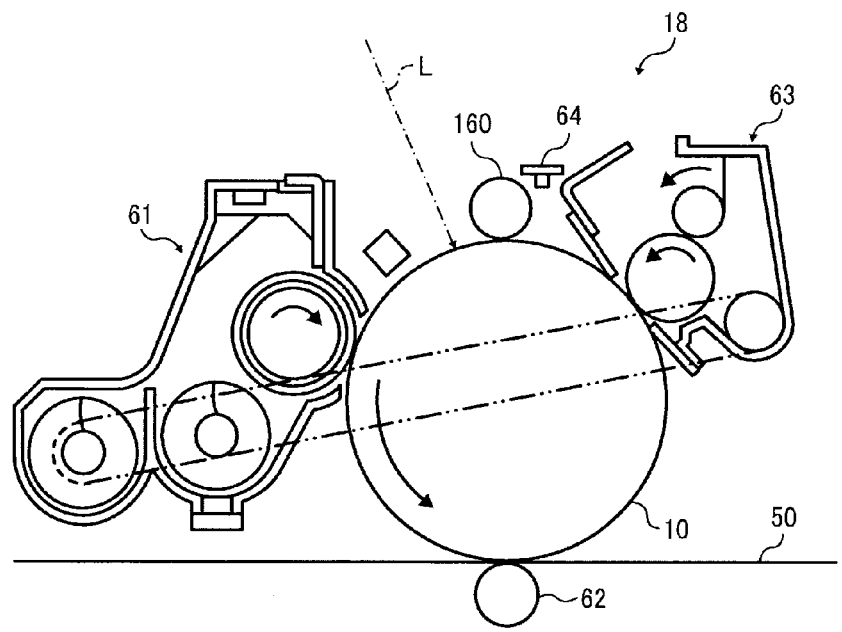
FIG. 3 is a magnified view of a part of the image forming apparatus illustrated in FIG. 2.

FIG. 2 is a schematic view of an image forming apparatus according to another embodiment. An image forming apparatus 100B is a tandem-type full-color image forming apparatus including a main body 150, a paper feed table 200, a scanner 300, and an automatic document feeder (ADF) 400. FIG. 3 is a magnified view of a part of the image forming apparatus illustrated in FIG. 2.

A seamless-belt intermediate transfer medium 50 is disposed at the center of the main body 150. The intermediate transfer medium 50 is stretched taut with support rollers 14, 15, and 16 and is rotatable clockwise in FIG. 2. A cleaner 17 is disposed adjacent to the support roller 15. The cleaner 17 is adapted to remove residual toner particles remaining on the intermediate transfer medium 50. Four image forming units 18Y, 18C, 18M, and 18K (hereinafter collectively the "image forming units 18") adapted to form respective toner images of yellow, cyan, magenta, and cyan are disposed in tandem facing a surface of the intermediate transfer medium 50 stretched between the support rollers 14 and 15. The image forming units 18 form a tandem developing device 120. An irradiator 21 is disposed adjacent to the tandem developing device 120. A secondary transfer device 22 is disposed on the opposite side of the tandem developing device 120 with respect to the intermediate transfer medium 50. The secondary transfer device 22 includes a seamless secondary transfer belt 24 stretched taut with a pair of rollers 23. A recording medium conveyed by the secondary transfer belt 24 is brought into contact with the intermediate transfer medium 50. A fixing device 25 is disposed adjacent to the secondary transfer device 22. The fixing device 25 includes a seamless fixing belt 26 and a pressing roller 27 pressed against the fixing belt 26. A sheet reversing device 28 adapted to reverse a sheet of recording medium in duplexing is disposed adjacent to the secondary transfer device 22 and the fixing device 25.

In the tandem developing device 120, a full-color image is produced in the manner described below. A document is set on a document table 130 of the automatic document feeder 400. Alternatively, a document is set on a contact glass 32 of the scanner 300 while lifting up the automatic document feeder 400, followed by holding down of the automatic document feeder 400.

Upon pressing of a switch, in a case in which a document is set on the contact glass 32, the scanner 300 immediately starts driving so that a first runner 33 and a second runner 34 start moving. In a case in which a document is set on the automatic document feeder 400, the scanner 300 starts driving after the document is fed onto the contact glass 32. The first runner 33 directs light to the document and reflects a light reflected from the document toward the second runner 34. The second runner 34 then reflects the light toward a reading sensor 36 through an imaging lens 35. Thus, image information of black, magenta, cyan, and yellow is read.

The image information of yellow, cyan, magenta, and black are respectively transmitted to the image forming units 18Y, 18C, 18M, and 18K. The image forming units 18Y, 18C, 18M, and 18K form respective toner images of yellow, cyan, magenta, and black. As illustrated in FIG. 3, each of the image forming units 18 includes a photoreceptor 10, a charger 160 adapted to uniformly charge the photoreceptor 10, an irradiator adapted to irradiate the charged surface of the photoreceptor 10 with light L containing image information to form an electrostatic latent image, a developing device 61 adapted to develop the electrostatic latent image into a toner image, a transfer charger 62 adapted to transfer the toner image onto the intermediate transfer medium 50, a cleaner 63, and a neutralization lamp 64. The toner images of yellow, cyan, magenta, and black are sequentially transferred from the respective photoreceptors 10Y, 10C, 10M, and 10K onto the intermediate transfer medium 50 that is endlessly moving. Thus, the toner images of yellow, cyan, magenta, and black are superimposed on one another on the intermediate transfer medium 50, thus forming a composite full-color toner image.

On the other hand, upon pressing of the switch, one of paper feed rollers 142 starts rotating in the paper feed table 200 so that a sheet of a recording medium is fed from one of paper feed cassettes 144 in a paper bank 143. The sheet is separated by one of separation rollers 145 and fed to a paper feed path 146. Feed rollers 147 feed the sheet to a paper feed path 148 in the main body 150. The sheet is then stopped by a registration roller 49. Alternatively, a recording medium may be fed from a manual feed tray 54. In this case, a separation roller 58 separates a sheet of the recording medium and feeds it to a manual paper feed path 53. The sheet is then stopped by the registration roller 49. Although the registration roller 49 is generally grounded, the registration roller 49 can be supplied with a bias for the purpose of removing paper powders from the sheet. The registration roller 49 feeds the sheet to the gap between the intermediate transfer medium 50 and the secondary transfer belt 24 in synchronization with an entry of the composite full-color toner image formed on the intermediate transfer medium 50 into the gap. Thus, the composite full-color toner image is transferred onto the sheet. After the composite toner image is transferred, residual toner particles remaining on the intermediate transfer medium 50 are removed by the cleaner 17.

The sheet having the composite toner image thereon is fed from the secondary transfer device 22 to the fixing device 25. The fixing device 25 fixes the composite toner image on the sheet by application of heat and/or pressure. The sheet is then discharged by a discharge roller 56 to be stacked on the discharge tray 57. Alternatively, the switch claw 55 switches paper feed paths so that the sheet gets reversed in the sheet reversing device 28. After forming another toner image on the back side of the sheet, the sheet is discharged onto the discharge tray 57 by rotation of a discharge roller 55.

A process cartridge according to an embodiment includes at least an electrostatic latent image bearing member adapted to bear an electrostatic latent image and a developing device adapted to develop the electrostatic latent image into a toner image with the toner according to an embodiment. The process cartridge is detachably attachable to image forming apparatuses.

The developing device includes at least a developer container for containing the developer according to an embodiment and a developer bearing member adapted to bear and convey the developer in the developer container. The developing device may further include a toner layer regulator adapted to regulate the thickness of a toner layer on the developer bearing member.

Figure 4:
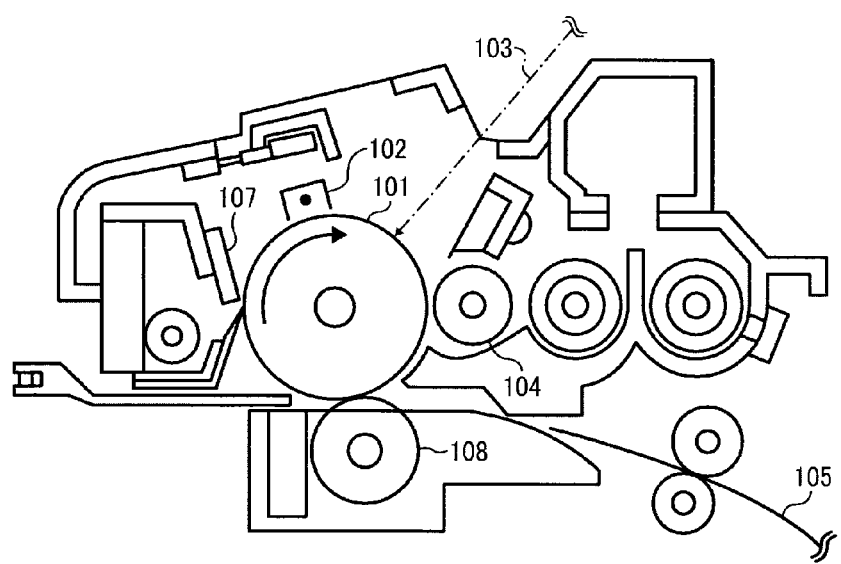
FIG. 4 is a schematic view of a process cartridge according to an embodiment.

FIG. 4 is a schematic view of a process cartridge according to an embodiment. The process cartridge includes an electrostatic latent image bearing member 101, a charger 102, a developing device 104, a transfer device 108, and a cleaner 107. In FIG. 4, a numeral 103 denotes a light beam emitted from an irradiator and a numeral 105 denotes a recording medium.

The electrostatic latent image bearing member 101 is charged by the charger 102 and then exposed to the light beam 103 emitted from the irradiator while rotating clockwise in FIG. 4. As a result, an electrostatic latent image is formed on the electrostatic latent image bearing member 101. The developing device 104 develops the electrostatic latent image into a toner image. The transfer device 108 transfers the toner image onto the recording medium 105. The cleaner 107 cleans the surface of the electrostatic latent image bearing member 101 after the toner image is transferred therefrom and a neutralizer further neutralizes the surface. The above-described procedures are repeated.

EXAMPLES

Having generally described embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

Measurement of Molecular Weight and Residual Monomer Quantity

In the following examples, number average molecular weight (Mn), weight average molecular weight (Mw), and molecular weight distribution (Mw/Mn) are determined by GPC (gel permeation chromatography) with reference to a calibration curve complied from polystyrene standard samples having known molecular weights under the following conditions.

Instrument: GPC (from Tosoh Corporation)
Detector: RI
Measurement temperature: 40° C.
Mobile phase: Tetrahydrofuran
Flow rate: 0.45 mL/min Measurement of 90% RH Thermal Deformation Temperature In the following examples, 90% RH thermal deformation temperature is determined using an instrument TMA (EX-STAR7000 from SII Nano Technology Inc.) as follows.

Fill a die having a diameter of 3 mm and a thickness of 1 mm with 5 to 10 mg of an analyte. Pelletize the analyte with a hand-powered press. Heat the pellet from 30° C. to 90° C. at a heating rate of 2° C./min at 90% RH by a temperature/humidity controller attached to the instrument while compressing the pellet at 100 mN with a standard probe, to detect displacement. A maximum peak observed in the resulting thermogram is regarded as 90% RH thermal deformation temperature.

Measurement of Glass Transition Temperature

In the following examples, glass transition temperature (Tg) is determined using an instrument DSC (Q2000 from TA Instruments) as follows.

Subject an aluminum simple sealed pan filled with 5 to 10 mg of an analyte to the following first heating, cooling, and second heating processes sequentially. Determine the glass transition temperature (Tg) from the thermogram resulted in the second heating by a midpoint method.

First heating: heat from 30 to 220° C. at a heating rate of 5° C./min and keep at 220° C. for 1 minute Cooling: quench to −20° C. without temperature control and keep at −20° C. for 1 minute Second heating: heat from −20 to 180° C. at a heating rate of 5° C./min Evaluation of Organic Solvent Solubility In the following examples, organic solvent solubility is evaluated as follows.

Agitate 1.5 g of an analyte (i.e., a resin) with 8.5 g of each of ethyl acetate, tetrahydrofuran, and toluene in a 20-mL screw vial for 24 hours. Thereafter, visually observe whether the analyte remain undissolved or not. When dissolved in all of the organic solvents, the analyte is regarded as having organic solvent solubility.

Preparation of Oligomer A (Oligomer Having Polyhydroxycarboxylic Acid Skeleton)

A flask is charged with 90 parts of L-lactide, 10 parts of D-lactide, and 11 parts of bis(2-hydroxyethyl)terephthalate (BHET). The inner temperature is gradually increased and the pressure is reduced so as to cause dewatering. The inner temperature is further increased under $N_2$ purge. After visually checking that the reaction system becomes homogenized, 0.03 parts of tin 2-ethylhexanoate are added to the flask to cause polymerization while the inner temperature is controlled so as not to exceed 190° C. After 2-hour reaction, the reaction system is switched to efflux system so that the unreacted lactides are removed under reduced pressure. Thus, the polymerization is terminated and an oligomer A is prepared.

Preparation of Oligomers B to O

The procedure for preparing the oligomer A is repeated except that the amounts of the L-lactide and D-lactide and the amount and kind of the diol are changed as described in Table 1. Thus, oligomers B to O are prepared.

TABLE 1

| Oligomer | L-Lactide (parts) | D-lactide (parts) | Diol Species | Amount (parts) |
|---|---|---|---|---|
| A | 90 | 10 | BHET | 11 |
| B | 80 | 20 | BHET | 7 |
| C | 70 | 30 | BHPT | 10 |
| D | 60 | 40 | BHPT | 10 |
| E | 85 | 15 | Compound (i) | 11 |
| F | 85 | 15 | Compound (ii) | 9 |
| G | 85 | 15 | BisA EO | 12 |
| H | 85 | 15 | BHET | 4 |
| I | 85 | 15 | BHET | 20 |
| J | 85 | 15 | BHET | 9 |
| K | 95 | 5 | BHET | 9 |
| L | 85 | 15 | BHET | 9 |
| M | 85 | 15 | 1,3-PD | 8 |
| N | 85 | 15 | BHET | 20 |
| O | 85 | 15 | 1,3-PD | 5 |

In Table 1, BHET represents bis(2-hydroxyethyl)terephthalate, BHPT represents bis(2-hydroxypropyl)terephthalate, BisA EO represents ethylene oxide adduct of bisphenol A, and 1,3-PD represents 1,3-Propanediol. The compounds (I) and (ii) have the following formulae.

Compound (i)

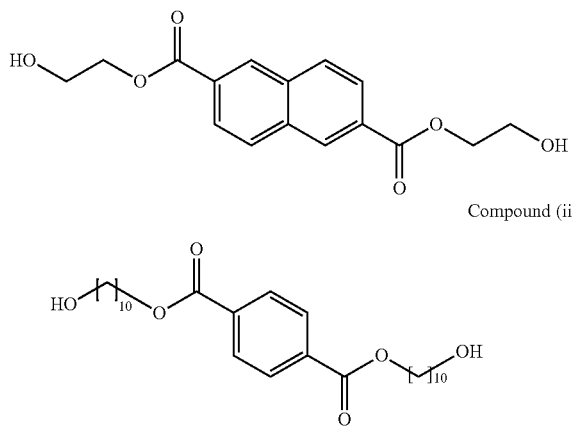

Compound (ii)

Preparation of Resin 1

A flask is charged with 100 parts of the oligomer A and 25 parts of a soft material (i.e., PTMG) and the inner temperature is gradually increased. After visually checking that the reaction system becomes homogenized, the reaction system is subjected to dewatering under reduced pressure. The inner temperature is further increased to 170° C. and 0.02 parts of tin 2-ethylhexanoate are added to the reaction system. Further, 14 parts of an elongating agent (i.e., isophorone diisocyanate (IPDI)) are added to the reaction system to cause an elongation reaction. Thus, a resin 1 is prepared.

Preparation of Resins 2 to 15

The procedure for preparing the resin 1 is repeated except that the amounts and kinds of the oligomer, soft material, and elongating agent are changed as described in Table 2. Thus, resins 2 to 15 are prepared.

TABLE 2

| Resin No. | Oligomer Species | Amount (parts) | Soft Material Species | Amount (parts) | Elongating Agent Species | Amount (parts) |
|---|---|---|---|---|---|---|
| 1 | A | 100 | PTMG | 25 | IPDI | 14 |
| 2 | B | 100 | PCL | 20 | IPDI | 10 |
| 3 | C | 100 | Dual-end-carbinol-modified Silicone | 10 | IPDI | 9 |
| 4 | D | 100 | 1,9-ND | 10 | IPDI | 20 |
| 5 | E | 100 | PTMG | 13 | IPDI | 10 |
| 6 | F | 100 | PTMG | 18 | IPDI | 7 |
| 7 | G | 100 | PTMG | 5 | IPDI | 8 |
| 8 | H | 100 | PCL | 5 | HDI | 3 |
| 9 | I | 100 | PTMG | 14 | IPDI | 17 |
| 10 | J | 100 | PTMG | 32 | EGDE | 11 |
| 11 | K | 100 | PBS | 3 | IPDI | 8 |
| 12 | L | 100 | PEG | 10 | IPDI | 8 |
| 13 | M | 100 | PTMG | 12 | IPDI | 24 |
| 14 | N | 100 | — | 0 | IPDI | 14 |
| 15 | O | 100 | — | 0 | IPDI | 14 |

In Table 2, PTMG represents poly(tetramethylene oxide) glycol, PCL represents polycaprolactone, 1,9-ND represents 1,9-nonanediol, PBS represents polybutylene succinate, PEG represents polyethylene glycol, IPDI represents isophorone diisocyanate, HDI represents hexamethylene diisocyanate, EGDE represents ethylene glycol diglycidyl ether, and Dual-end-carbinol-modified silicone represents X-22-160AS available from Shin-Etsu Chemical Co., Ltd.

Properties of the resins 1 to 15 are shown in Table 3.

TABLE 3

| Resin No. | Diol (% by weight) | Oligomer Molecular Weight (Mn) | Soft Segment (% by weight) | Resin Molecular Weight (Mn) | Glass Transition Temperature (° C.) | 90% RH Thermal Deformation Temperature (° C.) | Optical Purity (% by mol) | Organic Solvent Solubility |
|---|---|---|---|---|---|---|---|---|
| 1 | 7 | 2,500 | 18 | 25,000 | 58 | 51 | 80 | Yes |
| 2 | 5 | 4,000 | 15 | 28,000 | 57 | 54 | 60 | Yes |
| 3 | 8 | 3,000 | 8 | 25,000 | 59 | 52 | 40 | Yes |
| 4 | 7 | 3,000 | 8 | 15,000 | 61 | 53 | 20 | Yes |
| 5 | 8 | 3,000 | 11 | 26,000 | 59 | 52 | 70 | Yes |
| 6 | 6 | 6,000 | 14 | 32,000 | 57 | 50 | 70 | Yes |
| 7 | 9 | 3,000 | 4 | 24,000 | 55 | 49 | 70 | Yes |
| 8 | 3 | 7,000 | 5 | 28,000 | 52 | 46 | 70 | Yes |
| 9 | 13 | 1,500 | 11 | 20,000 | 64 | 55 | 70 | Yes |
| 10 | 6 | 3,000 | 22 | 25,000 | 52 | 47 | 70 | Yes |
| 11 | 8 | 3,000 | 3 | 26,000 | 62 | 56 | 90 | No |
| 12 | 7 | 3,000 | 8 | 24,000 | 61 | 54 | 70 | Yes |
| 13 | 6 | 1,000 | 9 | 12,000 | 45 | 40 | 70 | Yes |
| 14 | 15 | 1,500 | 0 | 17,000 | 65 | 60 | 70 | Yes |
| 15 | 4 | 1,000 | 0 | 16,000 | 48 | 44 | 70 | Yes |

Preparation of Toners 1 to 12

Preparation of Master Batch (a)

Raw materials described in Table 4 are mixed by a HENSCHEL MIXER to prepare a pigment aggregation into which water penetrates.

TABLE 4

| Master Batch (a) | |
| --- | --- |
| Pigment: C.I. Pigment Yellow 185 | 40 parts |
| Each Resin 1 to 12 | 60 parts |
| Water | 30 parts |

The pigment aggregation is then kneaded by double rolls having a surface temperature of 130° C. for 45 minutes and then pulverized into particles having a diameter of 1 mm by a pulverizer. Thus, a master batch (a) is prepared.

The resins used for each toner 1 to 12 are described in Table 5.

TABLE 5

| Toner No. | Resin No. |
| --- | --- |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |

Raw materials described in Table 6 are kneaded by a double-axis extruder at 100° C., followed by pulverization and classification, to prepare mother toner. The carnauba wax has a molecular weight of 1,800, an acid value of 2.7 mgKOH/g, and a penetration of 1.7 mm (40° C.). The charge controlling agent is E-84 available from Orient Chemical Industries Co., Ltd. Each mother toner in an amount of 100 parts is mixed with 0.5 parts of a hydrophobized silica and 0.5 parts of a hydrophobized titanium oxide by a HENSCHEL MIXER. Thus, toners 1 to 12 are prepared.

TABLE 6

| Toner Composition | |
| --- | --- |
| Each Resin 1 to 12 | 90 parts |
| Carnauba Wax | 4 parts |
| Master Batch (a) | 5 parts |
| Charge Controlling Agent | 1 part |

Preparation of Toners 13 to 17

Preparation of Polyester Prepolymer

A reaction vessel equipped with a condenser, a stirrer, and a nitrogen inlet pipe is charged with 720 parts of ethylene oxide 2 mol adduct of bisphenol A, 90 parts of propylene oxide 2 mol adduct of bisphenol A, 290 parts of terephthalic acid, 25 parts of trimellitic anhydride, and 2 parts of dibutyltin oxide. The mixture is subjected to a reaction for 8 hours at 230° C. under normal pressures and subsequent 7 hours under reduced pressures of 10 to 15 mmHg. Thus, an intermediate polyester resin is prepared.

The intermediate polyester resin has a number average molecular weight (Mn) of 2,500, a weight average molecular weight (Mw) of 10,700, a peak molecular weight of 3,400, a glass transition temperature (Tg) of 57° C., an acid value of 0.4 mgKOH/g, and a hydroxyl value of 49 mgKOH/g.

Another reaction vessel equipped with a condenser, a stirrer, and a nitrogen inlet pipe is charged with 400 parts of the intermediate polyester resin, 95 parts of isophorone diisocyanate, and 580 parts of ethyl acetate. The mixture is subjected to a reaction for 8 hours at 100° C. Thus, a polyester prepolymer is prepared.

The polyester prepolymer is including 1.42% of free isocyanates.

Preparation of Master Batch (b)

First, 1,000 parts of water, 530 parts of a carbon black (PRINTEX 35 from Degussa) having a DBP oil absorption of 42 ml/100 g and a pH of 9.5, and 1,200 parts of the resin are mixed using a HENSCHEL MIXER (from Mitsui Mining and Smelting Co., Ltd.).

The resulting mixture is kneaded for 30 minutes at 150° C. using double rolls, the kneaded mixture is then rolled and cooled, and the rolled mixture is then pulverized into particles using a pulverizer (from Hosokawa Micron Corporation). Thus, a master batch (b) is prepared.

Preparation of Ketimine Compound

A reaction vessel equipped with a stirrer and a thermometer is charged with 30 parts of isophoronediamine and 70 parts of methyl ethyl ketone. The mixture is subjected to a reaction for 5 hours at 50° C. Thus, a ketimine compound is prepared.

The ketimine compound has an amine value of 423 mgKOH/g.

Preparation of Resin Particle Dispersion

A reaction vessel equipped with a stirrer and a thermometer is charged with 600 parts of water, 120 parts of styrene, 100 parts of methacrylic acid, 45 parts of butyl acrylate, 10 parts of a sodium alkylallylsulfosuccinate (ELEMINOL JS-2 from Sanyo Chemical Industries, Ltd.), and 1 part of ammonium persulfate. The mixture is agitated for 20 minutes at a revolution of 400 rpm. Thus, a white emulsion is prepared.

The white emulsion is heated to 75° C. and subjected to a reaction for 6 hours.

A 1% aqueous solution of ammonium persulfate in an amount of 30 parts is further added to the emulsion, and the mixture is aged for 6 hours at 75° C. Thus, a resin particle dispersion (W) being an aqueous dispersion of a vinyl resin (i.e., a copolymer of styrene, methacrylic acid, butyl acrylate, and sodium alkylallylsulfosuccinate) is prepared.

The resin particles dispersed in the resin particle dispersion (W) have a volume average particle diameter of 0.08 μm measured by ELS-800.

The dried resin particles separated from the resin particle dispersion (W) have a glass transition temperature of 74° C. measured by a flow tester.

Preparation of Aqueous Medium

An aqueous medium is prepared by uniformly mixing and agitating 300 parts of ion-exchange water, 300 parts of the resin particle dispersion (W), and 0.2 parts of sodium dodecylbenzenesulfonate.

Preparation of Resin Solutions

Each resin solution is prepared by mixing and agitating each resin, the polyester prepolymer, and ethyl acetate as described in Table 7 in a reaction vessel.

TABLE 7

| Toner No. | Resin Solution No. | Resin No. | Resin Amount (parts) | Polyester Prepolymer Amount (parts) |
|---|---|---|---|---|
| 13 | 1 | 1 | 100 | 0 |
| 14 | 2 | 2 | 100 | 0 |
| 15 | 3 | 3 | 100 | 0 |
| 16 | 4 | 8 | 100 | 0 |
| 17 | 5 | 10 | 85 | 15 |

Preparation of Oily Liquids

Each resin solution in an amount of 400 parts, a carnauba wax (having a molecular weight of 1,800, an acid value of 2.7 mgKOH/g, and a penetration of 1.7 mm (at 40° C.)) in an amount of 5 parts, and the master batch (b) in an amount of 5 parts are subjected to a dispersion treatment using a bead mill (ULTRAVISCOMILL (trademark) from Aimex Co., Ltd.) filled with 80% by volume of zirconia beads having a diameter of 0.5 mm, at a liquid feeding speed of 1 kg/hour and a disc peripheral speed of 6 msec. This dispersing operation is repeated 3 times (3 passes). Thus, oily liquids 1 to 4 are prepared. With respect to an oily liquid 5, 2.5 parts of the ketimine compound are further added.

Preparation of Toner

In a vessel, 150 parts of the aqueous medium are mixed and agitated with 100 parts of each oily liquid for 10 minutes by a TK HOMOMIXER (from PRIMIX Corporation) at a revolution of 12,000 rpm. Thus, an emulsion slurry is prepared. A flask equipped with a stirrer and a thermometer is charged with 100 parts of the emulsion slurry. The emulsion slurry is agitated for 10 hours at 30° C. at a peripheral speed of 20 m/min so that the solvents are removed therefrom. Thus, a dispersion slurry is prepared.

Next, 100 parts of the dispersion slurry is filtered under reduced pressures to obtain a wet cake (i). The wet cake (i) is then mixed with 100 parts of ion-exchange water using a TK HOMOMIXER for 10 minutes at a revolution of 12,000 rpm, followed by filtration, thus obtaining a wet cake (ii). The wet cake (ii) is mixed with 300 parts of ion-exchange water using a TK HOMOMIXER for 10 minutes at a revolution of 12,000 rpm, followed by filtration. This operation is repeated twice, thus obtaining a wet cake (iii). The wet cake (iii) is mixed with 20 parts of a 10% aqueous solution of sodium hydroxide using a TK HOMOMIXER for 30 minutes at a revolution of 12,000 rpm, followed by filtration under reduced pressures, thus obtaining a wet cake (iv). The wet cake (iv) is mixed with 300 parts of ion-exchange water using a TK HOMOMIXER for 10 minutes at a revolution of 12,000 rpm, followed by filtration. This operation is repeated twice, thus obtaining a wet cake (v). The wet cake (v) is mixed with 20 parts of a 10% hydrochloric acid using a TK HOMOMIXER for 10 minutes at a revolution of 12,000 rpm. Thereafter, a 5% methanol solution of a fluorine-containing quaternary ammonium salt (FTERGENT F-310 from Neos Company Limited) is added so that the resulting mixture is including 0.1 parts of the fluorine-containing quaternary ammonium salt based on 100 parts of the solid components. The mixture is further agitated for 10 minutes, followed by filtration, thus obtaining a wet cake (vi). The wet cake (vi) is mixed with 300 parts of ion-exchange water using a TK HOMOMIXER for 10 minutes at a revolution of 12,000 rpm, followed by filtration. This operation is repeated twice, thus obtaining a wet cake (vii). The wet cake (vii) is dried by a circulating drier for 36 hours at 40° C., and filtered with a mesh having openings of 75 μm. Thus, mother toners 13 to 17 are prepared.

Each mother toner in an amount of 100 parts is mixed with 1.0 part of a hydrophobized silica (H2000 from Clariant Japan K.K.) using a HENSCHEL MIXER (from Mitsui Mining Co., Ltd.) at a peripheral speed of 30 m/sec for 30 seconds, followed by a pause for 1 minute. This mixing operation is repeated for 5 times (5 cycles). Thus, toners 13 to 17 are prepared.

Preparation of Comparative Toners 18 and 20

The procedure for preparing the toner 1 is repeated except that the resin is replaced as described in Table 8. Thus, comparative toners 18 and 20 are prepared.

TABLE 8

| Comparative Toner No. | Resin No. |
|---|---|
| 18 | 13 |
| 20 | 15 |

Preparation of Comparative Toner 19

The procedure for preparing the toner 13 is repeated except that the resin solution is replaced as described in Table 9. Thus, a comparative toner 19 is prepared.

TABLE 9

| Comparative Toner No. | Resin Solution No. | Resin No. | Resin Amount (parts) | Polyester Prepolymer Amount (parts) |
|---|---|---|---|---|
| 19 | 6 | 14 | 100 | 0 |

Preparation of Carrier

A resin layer coating liquid is prepared by dispersing 100 parts of a silicone resin (organo straight silicone), 5 parts of γ-(2-aminoethyl)aminopropyl trimethoxysilane, and 10 parts of a carbon black in 100 parts of toluene by a homomixer for 20 minutes.

The resin layer coating liquid is applied to the surfaces of 1,000 parts of magnetite particles having a volume average particle diameter of 50 μm using a fluidized bed coating device. Thus, a carrier is prepared.

Preparation of Developers

Each of the toners 1 to 17 and comparative toners 18 to 20 in an amount of 5 parts and the carrier in an amount of 95 parts are mixed. Thus, developers 1 to 17 and comparative developers 18 to 20 are prepared.

The above-prepared toners or developers are subjected to the following evaluations.

Evaluation of Fixability

An electrophotographic copier (MF-200 from Ricoh Co., Ltd.) employing a TEFLON® fixing roller is modified so that the temperature of the fixing roller is variable. Each developer is mounted on the copier, and a solid image having 0.85±0.1 mg/cm$^2$ of toner is formed on sheets of a normal paper TYPE 6200 (from Ricoh Co., Ltd.) and a thick paper <135> (from NBS Ricoh) while varying the temperature of the fixing roller to determine the maximum and minimum fixable temperatures. The minimum fixable temperature is a temperature below which the residual rate of image density after rubbing the solid image falls below 70% on the thick paper. The maximum fixable temperature is a temperature above which hot offset occurs on the normal paper.

Minimum Fixable Temperature Grades
A: less than 125° C.
B: not less than 125° C. and less than 130° C.
C: not less than 130° C. and less than 140° C.
D: not less than 140° C.

Maximum Fixable Temperature Grades
A: not less than 190° C.
B: not less than 180° C. and less than 190° C.
C: not less than 170° C. and less than 180° C.
D: less than 170° C.

Evaluation of Heat-Resistant Storage Stability

Each toner in an amount of 4 g is contained in an open-system cylindrical container having a diameter of 5 cm and a height of 2 cm and left for 72 hours at 45° C. and 65% RH. After slightly shaking the container, the toner is visually observed to determine whether toner aggregation is generated or not.

A: No toner aggregation is observed.
B: Toner aggregations in the number of 1 to 2 are observed.
C: Toner aggregations in the number of 3 to 5 are observed.
D: Toner aggregations in the number of 6 or more are observed.

Evaluation of Environmental Variation in Charge

Each developer is agitated by a ball mill for 5 minutes at 23° C., 50% RH (i.e., M/M environment). Thereafter, 1.0 g of the developer is taken out and subjected to a measurement of charge by a blow off charge measuring device (TB-200 from KYOCERA Chemical Corporation). The charge is measured after the developer is exposed to nitrogen gas blow for 1 minute. The same procedure is repeated at 40° C., 90% RH (i.e., H/H environment) and at 10° C., 30% RH (i.e., L/L environment).

The environmental variation is determined from the following formula. The smaller the environmental variation, the better the charge stability of developer:

$$\text{Environmental Variation} = 2 \times \frac{([L/L] - [H/H])}{([L/L] + [H/H])} \times 100 (\%)$$

wherein [L/L] and [H/H] represent charge amounts in L/L and H/H environments, respectively.

A: less than 40%
B: not less than 40% and less than 50%
C: not less than 50% and less than 60%
D: not less than 60%

Evaluation of Charge Stability

Each developer is set in a digital full-color printer (IMAGIO NEO C455 from Ricoh Co., Ltd.) to perform a running test in which a monochrome image chart having an image area ratio of 50% is continuously formed on 300,000 sheets of paper. Charge stability is evaluated by the charge variation of the carrier before and after the running test.

Specifically, the initial charge Q1 is measured as follows. First, 6.000 g of the fresh carrier and 0.452 g of each toner are left for 30 minutes or more at 23° C., 50% RH (i.e., M/M environment). Thereafter, the carrier and toner are sealed in a stainless-steel container and shaken for 5 minutes by a shaker YS-LD (from YAYOI Co., Ltd.) at an output scale of 150 so that the carrier and toner are frictionally charged by about 1,100 times of shaking. The carrier and toner are subjected to a measurement of charge by a blow off charge measuring device (TB-200 from KYOCERA Chemical Corporation). The charge Q2 of the developer exposed to the running set is measured by the same manner. The charge variation is determined from |Q1−Q2| and graded as follows.

A: |Q1−Q2| is less than 10 μC/g
B: |Q1−Q2| is not less than 10 μC/g and less than 15 μC/g
C: |Q1−Q2| is not less than 15 μC/g and less than 20 μC/g
D: |Q1−Q2| is not less than 20 μC/g The evaluation results are shown in Table 10.

TABLE 10

| | Fixability | | Heat-resistant Storage Stability | Environmental Variation in Charge | Charge Stability |
|---|---|---|---|---|---|
| | Minimum Fixable Temperature | Maximum Fixable Temperature | | | |
| Toner 1 | A | A | A | A | A |
| Toner 2 | A | A | A | A | A |
| Toner 3 | A | A | A | A | A |
| Toner 4 | B | A | A | A | A |
| Toner 5 | A | A | A | A | A |
| Toner 6 | A | A | A | A | A |
| Toner 7 | A | A | B | B | A |
| Toner 8 | A | A | B | B | A |
| Toner 9 | B | A | A | A | A |
| Toner 10 | A | B | B | B | B |
| Toner 11 | B | A | A | A | A |
| Toner 12 | B | A | A | A | A |
| Toner 13 | B | A | A | A | A |
| Toner 14 | B | A | A | A | A |
| Toner 15 | B | A | A | A | A |
| Toner 16 | A | A | A | A | A |
| Toner 17 | A | B | A | A | B |
| Comparative Toner 18 | A | C | D | C | C |
| Comparative Toner 19 | C | A | A | A | C |
| Comparative Toner 20 | B | C | D | D | B |

Additional modifications and variations in accordance with further embodiments of the present invention are possible in light of the above teachings. It is therefore to be understood that within the scope of the appended claims the invention may be practiced other than as specifically described herein.

What is claimed is:

1. A resin for a toner, the resin comprising a skeleton formed by reacting an oligomer segment comprising a polyhydroxycarboxylic acid skeleton and an aromatic diol skeleton; and a soft segment,
wherein an aromatic diol of the aromatic diol skeleton has the following formula (1):

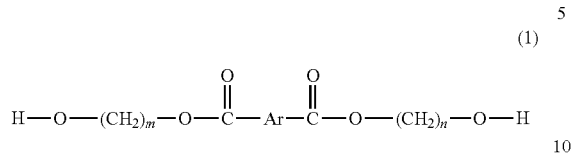

(1)

wherein Ar represents an aromatic group and m and n independently represent an integer of 2 to 10,
wherein the soft segment comprises at least one member selected from the group consisting of poly(tetramethylene oxide) glycol and a modified silicone in which both terminals are modified with carbinol.

* * * * *